J. M. Dick.
Railroad Frog,
No. 903 Reissued Feb. 21, 1860.
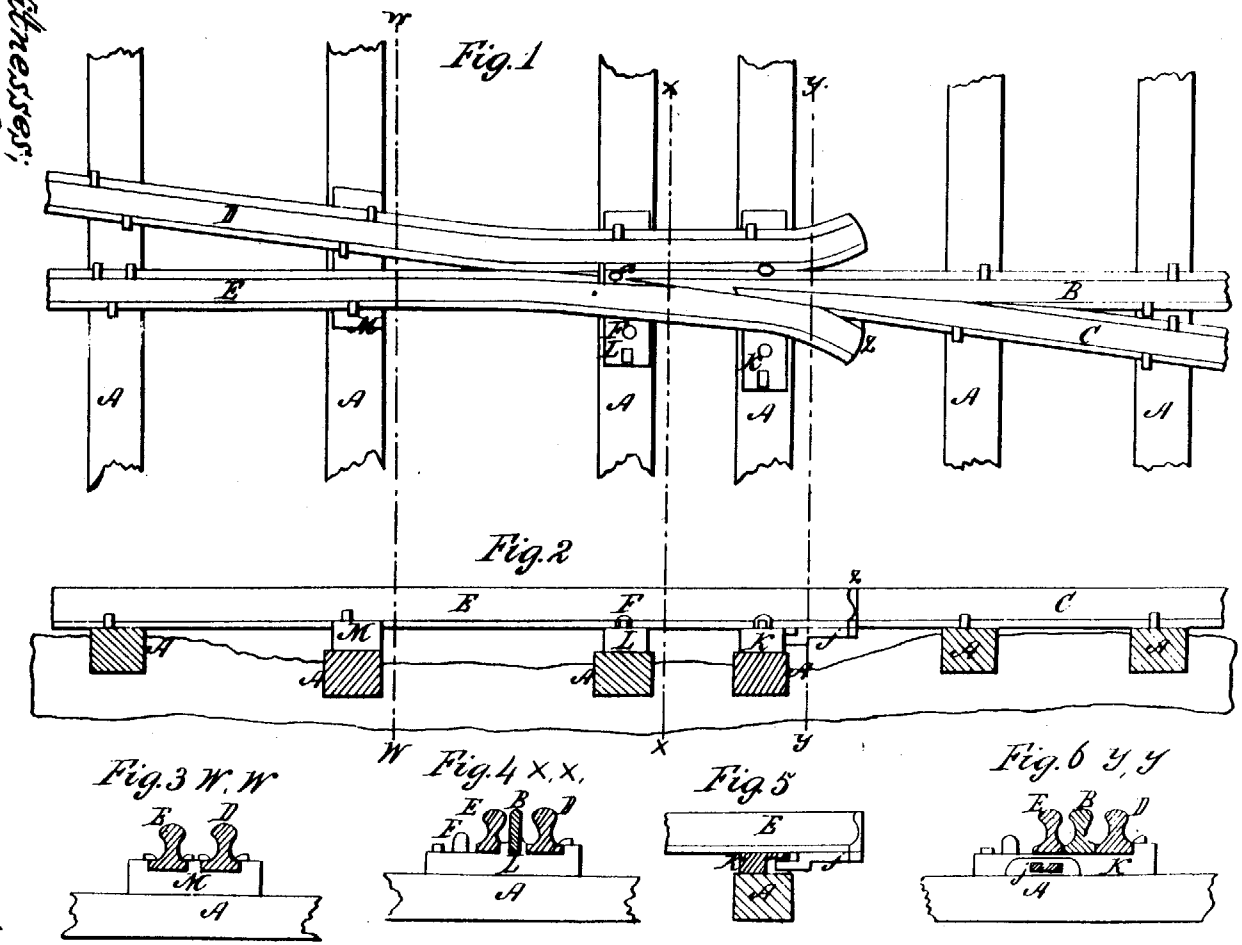
Witnesses;
Wm. H. Pitkin
Andrew Delany
Inventor;
James M. Dick
H. PETERS, PHOTO-LITHOGRAPHER, WASHINGTON, D. C.

BEST AVAILABLE COPY
BEST AVAILABLE COPY

UNITED STATES PATENT OFFICE.

JAMES M. DICK, OF BUFFALO, NEW YORK.

IMPROVEMENT IN RAILROAD-FROGS.

Specification forming part of Letters Patent No. 21,067, dated August 3, 1858; Reissue No. 903, dated February 21, 1860.

*To all whom it may concern:*

Be it known that I, JAMES M. DICK, of Buffalo, in the State of New York, have invented certain new and useful Improvements in Railroad-Frogs; and I do hereby declare that the following is a full, clear, and exact description thereof, reference being had to the accompanying drawings, making part of this specification, in which—

Figure 1 is a plan; Figs. 2 a longitudinal vertical section; Fig. 3, a cross vertical section taken at the line W W of Figs. 1 and 2, and representing the parts on the left-hand side of that line; Fig. 4, a vertical section taken at the line X X of Figs. 1 and 2, and representing the parts on the left-hand side of that line; Fig. 5, a section representing the method of holding down the movable end of the movable rail; and Fig. 6, a cross vertical section taken at the line Y Y of Figs. 1 and 2, and representing the parts on the left-hand side of that line.

The same letters indicate like parts in all the figures.

Prior to my invention it had been proposed to form frogs for railroads by a continuation of the four rails, three of which were fastened down upon one base or bed-plate, and the fourth rail so connected with the base or bed-plate, and with some of the other rails by means of a rod as to admit of being sprung out from the point of the frog by the passage of the flange of the wheels, which mode of construction is defective for various reasons which will hereinafter appear.

The object of my said invention is to avoid the defects of frogs as heretofore constructed, as well as the defects of all other modes of construction heretofore suggested, and which have not, by reason of their defects, gone into practical use.

The continuation of the rails B C and D E, which together constitute the frog, have their webs let down into cavities in a series of metallic chairs, (respectively indicated by the letters K L M,) and secured therein by spikes which pass through holes in the chairs, and which are driven into the cross-ties A, on which the chairs are placed, the heads of the spikes extending over the webs of the rails.

[illegible] rails B and C in the shape of a semi-dovetail and fitted to a recess of corresponding shape in the side of the other, B, which beyond this junction forms the extreme point of the frog. The said extreme point is for greater security secured to the chair L and its cross-tie by a suitable spike, as represented at *a*.

The rail D is curved in the form usually given to this part of a frog and fastened down to the chairs, as before stated, leaving the required space between the inner edge of this and the outer edge of that part of the rail B which forms the point of the frog, to allow the free passage of the flanges of wheels when traveling in another direction, and the other rail, E, is secured in the manner before stated to the chair, M, and from that point to the extreme end, Z, is free to spring laterally, the recesses in the chairs K and L for this rail being made in the form of a rabbet—that is, without a flange or shoulder on that side—and with a stop, F, to limit the extent to which the rail shall be permitted to spring, although as an equivalent for this stop one or both of the chairs may be formed with a recess of sufficient width to admit of the required play, the outer shoulder of the recess being employed as the stop F. The end of this rail is so curved as by its own inward spring to be in contact with that part of the point of the frog which lies between the two chairs K and L, but not along those parts which are above those chairs, as this spring-rail should be so curved as to gradually approach the side of the point of the frog and be in contact with it some distance back of the extreme point, and then recede from it, for purposes well-known to engineers.

To the under part of the rail E is firmly secured a lip, *j*, the end of which extends under the chair K, the under part of which is rabbeted for that purpose, the rabbet being made of sufficient length to allow the rail to spring outward, as before stated. In this way the movable end of the spring-rail E is effectually held down to the chair, notwithstanding it may be readily removed for the purposes of repair without disturbing any other part of the frog by simply removing the spikes by which it is secured to the chair M. This mode of holding down the springing rail by the said [illegible] of thus readily remov-

BEST AVAILABLE COPY ing this part of the frog, but also avoiding all binding from expansion and contraction of the rail; and it will also be seen that each one of the four rails constituting the frog can be separately removed for repairs and replaced without disturbing in any manner the others, thus greatly reducing the cost of repairs. Between the several cross-ties which sustain the chairs of the frog the earth is to be removed or not filled up to the level of the chairs, to leave free open space between the cross-ties. By reason of this and the securing of the several rails constituting the frog to a series of separate chairs, stones, dirt, or other matter which may enter between the rail E when sprung out and the other parts of the frog will fall through out of the way, instead of remaining there to prevent the rail from springing back. This is of importance in view of safety.

I do not wish to be understood as making claim, broadly, to the construction of frogs of four separate rails, as this was known prior to my said invention; but What I do claim as my invention, and desire to secure by Letters Patent, is—

1. Combining the four rails, arranged in the manner before described, to form a frog by attaching them separately to a series of separate chairs, in manner substantially as herein described, so that each part may be removed for repairs and replaced independently of the other parts, as set forth.

2. Holding down the movable end of the springing rail of the frog to its chair, so that it shall be free to expand and contract and spring laterally, by combining it with the chair by means of the lip extending under and embracing the chair, substantially as described.

JAMES M. DICK.

Witnesses:

WM. A. BISHOP,

ANDREW DE LACY.